United States Patent
Lakos et al.

(10) Patent No.: US 10,771,519 B2
(45) Date of Patent: Sep. 8, 2020

(54) PROXY STREAMS IN A VIDEO STREAMING NETWORK

(71) Applicant: INTERNATIONAL BUSINESS MACHINES CORPORATION, Armonk, NY (US)

(72) Inventors: Peter Lakos, Gyal (HU); Jozsef Ecsedi, Szentes (HU); Balazs Vida, Pomaz (HU); Virag-Horvath Ori, Tomord (HU); Gergely Hodicska, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/423,331

(22) Filed: May 28, 2019

(65) Prior Publication Data
US 2019/0281099 A1    Sep. 12, 2019

Related U.S. Application Data

(63) Continuation of application No. 15/204,414, filed on Jul. 7, 2016, now Pat. No. 10,382,508.
(Continued)

(51) Int. Cl.
*H04L 12/26* (2006.01)
*H04L 29/06* (2006.01)
*H04L 29/08* (2006.01)

(52) U.S. Cl.
CPC .......... *H04L 65/4076* (2013.01); *H04L 43/12* (2013.01); *H04L 43/50* (2013.01);
(Continued)

(58) Field of Classification Search
CPC ...... H04L 65/40; H04L 67/1095; H04L 43/50
(Continued)

(56) References Cited

U.S. PATENT DOCUMENTS

| | | | |
|---|---|---|---|
| 2006/0088035 A1* | 4/2006 | Beeson | H04L 65/80 370/395.52 |
| 2010/0080143 A1* | 4/2010 | Topaltzas | H04W 24/00 370/253 |

(Continued)

OTHER PUBLICATIONS

Office Action (dated Mar. 26, 2018) for U.S. Appl. No. 15/204,414, filed Jul. 7, 2016.
(Continued)

*Primary Examiner* — Glenford J Madamba
(74) *Attorney, Agent, or Firm* — Schmeiser, Olsen & Watts, LLP; James Nock

(57) ABSTRACT

A method and system method for code testing in a video streaming network. A first broadcast stream including a first program containing video content is received by an ingest server of a live cluster of servers, wherein the live cluster of servers is deployed for providing streaming media programs to multiple user devices. The first broadcast stream is provided to one or more user devices. A copy of the first broadcast stream is provided to a device under test configured to test new code installed at the device under test via a processing of the first broadcast stream by the new code installed at the device under test. The device under test is a generic computer. Error performance of the device under test is monitored with respect to the installed new code's processing of the first broadcast stream.

20 Claims, 14 Drawing Sheets

Related U.S. Application Data

(60) Provisional application No. 62/191,210, filed on Jul. 10, 2015.

(52) U.S. Cl.
CPC .......... *H04L 65/605* (2013.01); *H04L 65/608* (2013.01); *H04L 67/1095* (2013.01)

(58) Field of Classification Search
USPC ........................................................ 709/219
See application file for complete search history.

(56) References Cited

U.S. PATENT DOCUMENTS

2012/0140081 A1* 6/2012 Clements ............... H04N 17/04
    348/181
2017/0013032 A1 1/2017 Lakos et al.

OTHER PUBLICATIONS

Amednment (dated Jun. 26, 2018) for U.S. Appl. No. 15/204,414, filed Jul. 7, 2016.
Final Office Action (dated Nov. 16, 2018) for U.S. Appl. No. 15/204,414, filed Jul. 7, 2016.
Final amendment (dated Jan. 15, 2019) for U.S. Appl. No. 15/204,414, filed Jul. 7, 2016.
Advisory action (dated Feb. 1, 2019) for U.S. Appl. No. 15/204,414, filed Jul. 7, 2016.
RCE (Feb. 19, 2019) for U.S. Appl. No. 15/204,414, filed Jul. 7, 2016.
Notice of Allowance (dated Mar. 29, 2019) for U.S. Appl. No. 15/204,414, filed Jul. 7, 2016.

* cited by examiner

```
http[s]://<address>:<port>/?cid=<cid>&host=<host>[&toTest=true]

{
  "type" : "newproxy",
  "data" : {
    "success" : <success : boolean>,
    "sourceHostName" : <sourceHostName : String>,
    "sourceCid" : <sourceCid : long>,
    "destinationHostName" : <destinationHostName : String>,
    "destinationCid" : <destinationCid : long>,
    "generated" : <generated : boolean>,
    "errorReason" : <errorReason : String>
  }  ⟵ 703
}

"18693054" : {
  "target_cid" : "19311255",
  "channelKey" : "mySecretChannelKey"
  "broadcastUrls" : [
    "rtmp://........"
  ]
}  ⟵ 705

"1524":{}  ⟵ 707
```

FIG. 7 http[s]://<address>:<port>/?stop=<cid>

```
{
  "type" : "stopproxy",
  "data" : {
    "success" : <success : boolean>,
    "sourceCid" : <sourceCid : long>,
    "errorReason" : <errorReason : String>
  }
}
```

FIG. 10

PROXY STREAMS IN A VIDEO STREAMING NETWORK

This application is a continuation application claiming priority to Ser. No. 15/204,414, filed Jul. 7, 2016, which claims priority to U.S. Provisional No. 62/191,210, filed on Jul. 10, 2015, which is incorporated herein by reference in its entirety.

TECHNICAL FIELD

The present invention relates to multimedia streaming over digital communication networks.

BACKGROUND

Increased availability and use of internet technology is making it possible to distribute multimedia content to users using the internet and internet protocol (IP). Anyone with access to the internet can become a content provider by uploading digital audio or video to a streaming media service and make the uploaded content available to thousands of users. The operational details of providing access to the users to the uploaded content are then taken care of by the streaming media service platform.

A streaming media platform facilitates distribution of audio video programs, or media content, to users. The streaming media platform may store content on storage media; e.g., a magnetic hard drive that may be available locally or via a storage area network connection. Users may be able to browse through the available content and request transmission of a desired video program. The content may then be sent to the user's device using one of many possible transmission protocols.

In some implementations, a server-controlled protocol may be used for delivering media to user devices. In a server-controlled streaming protocol, a server may keep track of packets sent to a particular user device and may also manage the rate at which to send the media data to the user device and the amount to be sent each time. The Real Time Streaming Protocol (RTSP) is an example of a server-controlled protocol. The Flash Media Server (FMS) is a commercially available product by Adobe Systems, and is a popular streaming media server that is used by many providers of streaming media solutions. Deployment examples of FMS are used herein for illustrative purpose only and not as a limitation to the disclosed embodiments. Commercially available streaming media server platforms; e.g., FMS, are often available to streaming media service providers as a "black box" in that the streaming media service providers cannot alter the software but can only build solutions using application programming interfaces (APIs) provided by the streaming media server platforms.

Even with off-the-shelf streaming media servers being commercially available, content providers still have to overcome several technical challenges to be able to stream content to multiple users. This task becomes even more difficult because of prevailing use of many different video encoding and streaming standards, and implementations of these encoding and streaming standards by different vendors, resulting in many different variations of encoded video bitstreams, and corresponding multiple different versions of streaming media players that receive and display content on user devices.

As a result of such multiplicity of video encoder implementations and video player implementations, making code changes to the streaming media platform poses an extremely complex technical problem. Furthermore, the streaming media platform operator may be subject to additional complexity by having to test compatibility between the variations in streaming media formats, generated by different encoders and streaming media players, implemented by different vendors.

SUMMARY

The present invention provides a method, and an associated computer program product and computer system, for code testing in a video streaming network. An ingest server of a live cluster of servers receives, via one or more processors, a first broadcast stream comprising a first program containing video content, wherein the live cluster of servers is deployed for providing streaming media programs to multiple user devices. The one or more processors provide the first broadcast stream to one or more user devices. The one or more processors provide the first broadcast stream to one or more user devices. The one or more processors duplicate the first broadcast stream to generate a copy of the first broadcast stream. The one or more processors provide the copy of the first broadcast stream to a device under test configured to test processing of the first broadcast stream by new code installed at the device under test. The one or more processors monitor error performance of the device under test with respect to the new code's processing of the first broadcast stream.

BRIEF DESCRIPTION OF THE DRAWINGS

FIG. 7 shows example configuration file listings for a request to start a proxy operation and a structure generated in response to the request, in accordance with embodiments of the present invention.

FIG. 10 shows an example code listing for messages used during stopping stream proxy operation upon encountering an error, in accordance with embodiments of the present invention.

DETAILED DESCRIPTION

The present invention improves the technology of video streaming and in particular, the technology of code testing in a video streaming network. In addition, the present invention improves the functioning of a computer system comprising a cluster of servers; in particular, a Beta cluster of servers and a Test cluster of servers.

Figure 1:
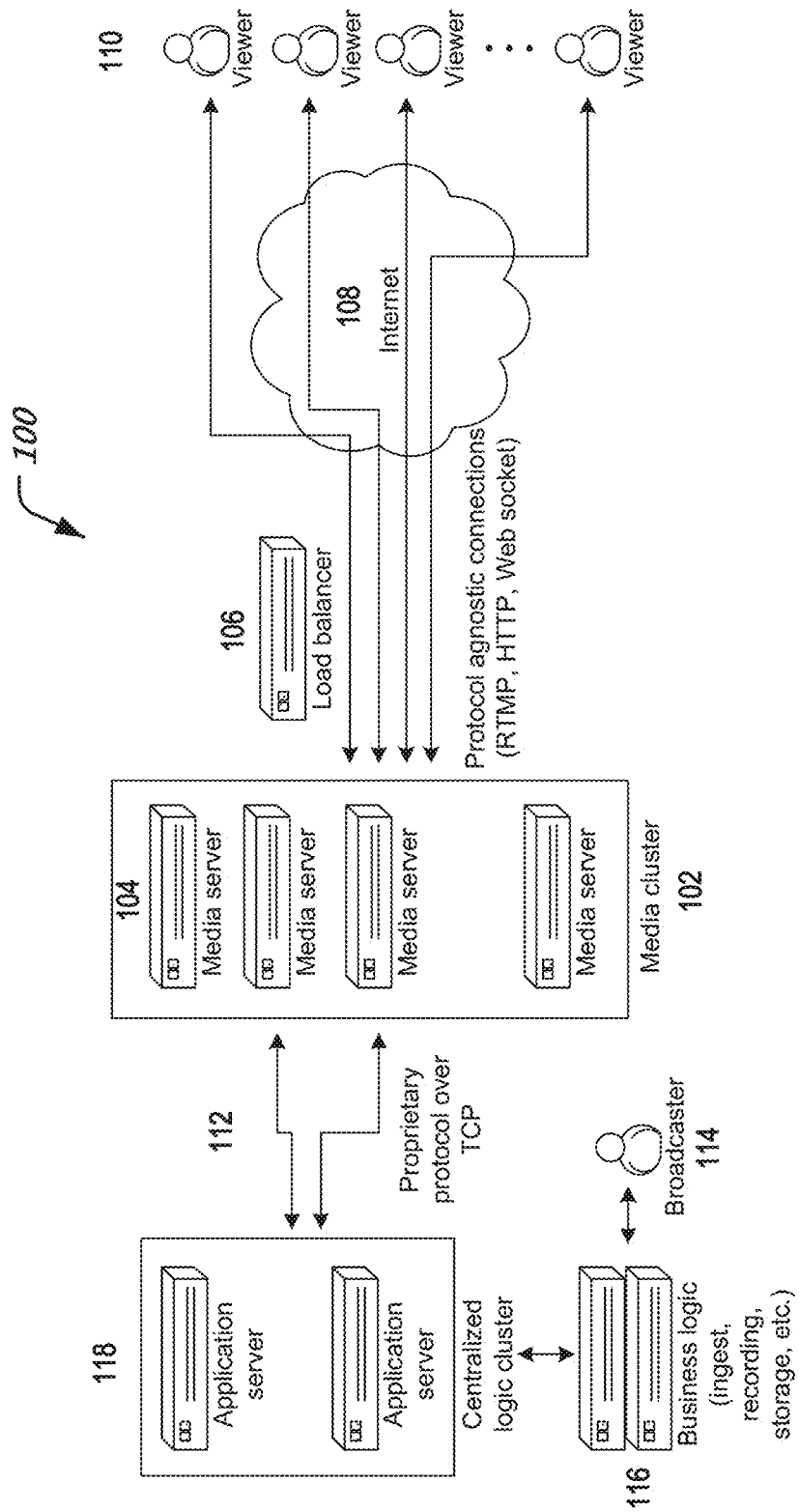
FIG. 1 shows an example communication network, in accordance with embodiments of the present invention.

FIG. 1 shows an example network 100, in accordance with embodiments of the present invention. In the network 100, multimedia programming is provided from a media cluster 102 of multiple streaming media servers 104. Media programs may be streamed over a communication medium such as the internee 108 to a plurality of user devices 110 that enable viewers to view or listen to the content of the programs. The network 106 may also use load balancers 106 to perform load balancing; e.g., as described herein.

The cluster 102 of media servers 104 may be geographically spread over a wide region; e.g., multiple states, countries or continents. Each media server 104 may generally correspond to a single hardware platform; e.g., one power supply with one hardware on/off switch, while a single hardware platform may include multiple processors and/or storage devices.

The media cluster 102 may receive multimedia programming from broadcasters 114 via a communication connection 112. Various protocols may be used for transferring data over the connection 112, including standard Transmission Control Protocol (TCP) or a proprietary protocol. Broadcasters 114 may provide content via business logic 116 of the network 100, which may then use one or more application servers 118, e.g., a central storage, to route the content into the media cluster 102. Some content provided in the network 100 may be read off a storage medium; e.g., a hard drive. Real time broadcast content may, however, be processed through the network 100 with minimal delay, typically 3 to 10 seconds, and provided to user devices 110. With live events such as sports programming, breaking news and so on, more than 10 seconds of delay is often considered unacceptable.

Figure 2:
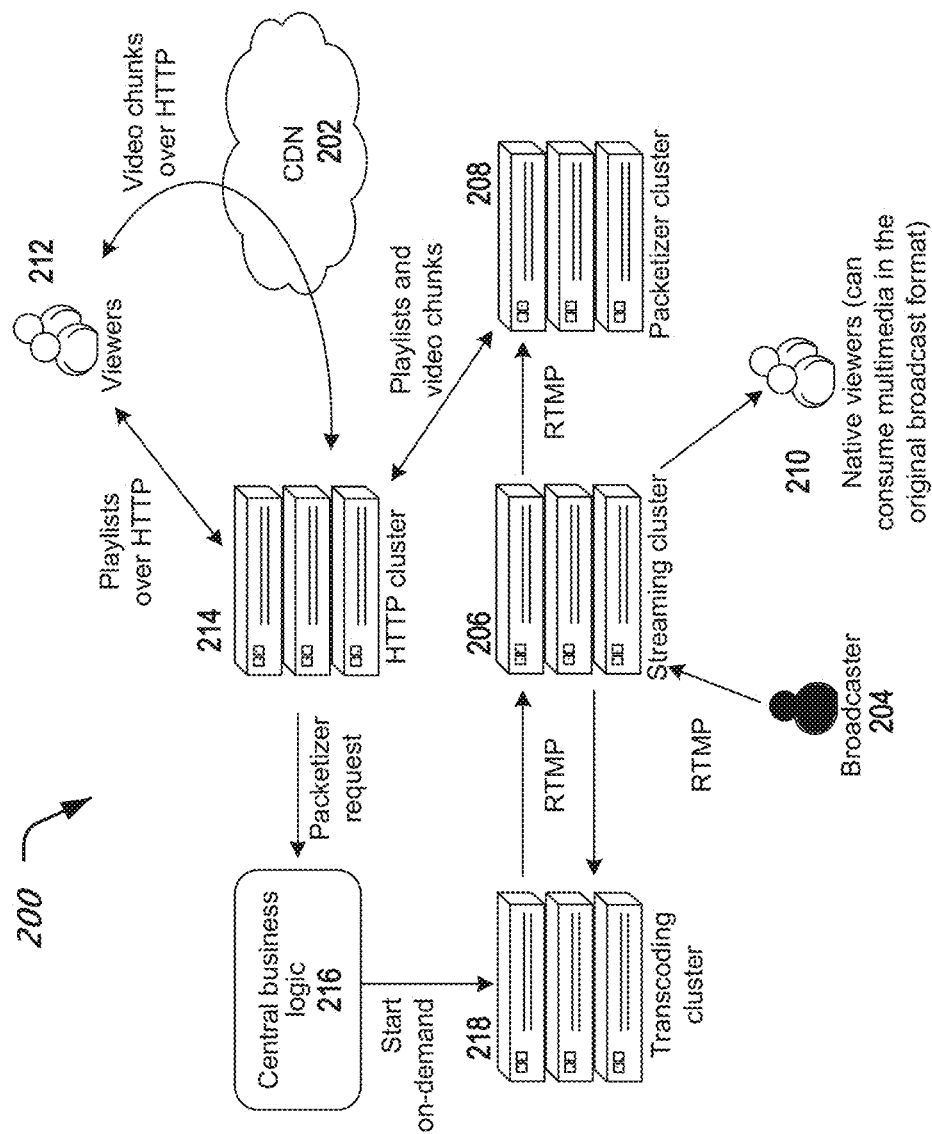
FIG. 2 shows an example streaming media network in which a content distribution network (CDN) is present, in accordance with embodiments of the present invention.

FIG. 2 shows an example of a streaming media network 200 in which content distribution network (CDN) 202 is present, in accordance with embodiments of the present invention. The CDN 202 is used to provide streaming content to user devices 212. In network 200, broadcasters 204 can provide content to a cluster 206 of streaming media servers which may provide the broadcaster's programs to local viewers 210. The programs may also be provided using a server-controlled protocol such as the Real Time Messaging Protocol (RTMP). The server-controlled or push mode could be used to push content to packetizers 208. The packetizers 208 may in turn generate logical groupings or chunks of video; e.g., 5 to 10 second long segments, along with play lists for the same, and provide the chunked content to a cluster of servers 214 that can provide the chunked video to viewers 212 via the CDN 202 using a pull mode such as the HTTP live streaming (HLS) protocol. The playlists may be provided via Hypertext Transfer Protocol (HTTP) messages while the content may be provided via the CDN 202. The network 200 may also include a transcoding cluster 218 which may alter the bitrate and other encoding characteristics of the content, under the control of central business logic 216.

Figure 3:
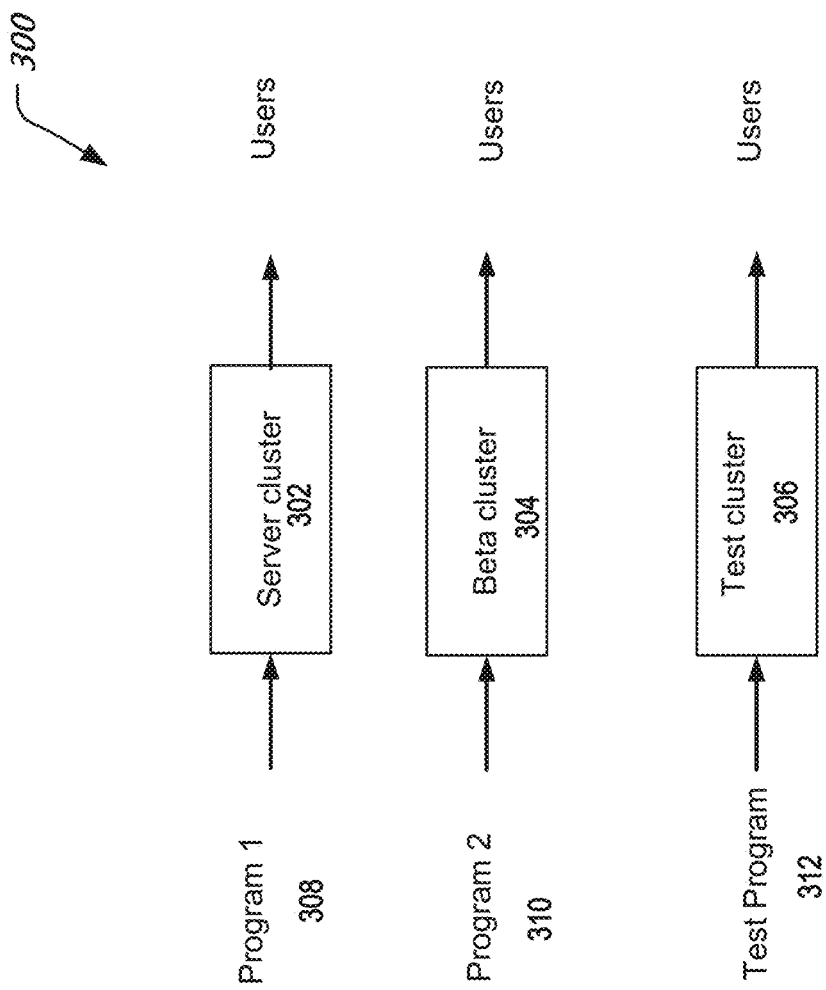
FIG. 3 shows an example configuration of streaming media clusters for testing server code changes, in accordance with embodiments of the present invention.

FIG. 3 shows an example configuration 300 of streaming media clusters for testing server code changes, in accordance with embodiments of the present invention. A streaming media cluster 302, called the live cluster, represents one or more servers that perform the task of ingesting broadcast media from content providers and streaming the programs to one or more user devices (e.g., program1 308). The streaming media cluster 302 may represent a service provider's "revenue generating" servers that are running stable and tested code base for providing streaming media service to user devices. The live cluster 302, e.g., uses production code which is not being changed during the time the production code is being used for streaming.

The Beta cluster 304 may use newer server code which may have to be tested for larger amounts of traffic before the newer server code can be deployed as production code. A streaming media service provider may direct a group of users that may h rare tolerant to any possible glitches in the streaming service to the beta cluster. These servers denoted as Beta servers in the Beta cluster 304 are less stable than servers on the streaming media cluster 302, but streaming actual media traffic (program2 310) on the servers in the beta cluster roots out any incompatibility issues. Since the programs from the Beta cluster 304 are usually free to users, such users may have more tolerance to possible glitches in the streaming media service. Correspondingly, the programs (e.g., program2 310) made available to users through beta clusters may include programs that are relatively well-tested and/or have low risk in terms of technical failures or revenue impact.

The Test cluster 306 represents one or more streaming media servers that are running a code base (e.g., Test Program 312) that is being tested. The code base may cause the server in the Test cluster 306 to receive ingest media and package the media into a format that is expected by user devices. The code base may also cause the server to organize the received content into titles that are accessible via a catalogue or a program guide. The code base may also cause the received stream to be encrypted or access controlled; e.g., by a username/password combination. The code base may also generate billing entries and usage database such that users that access the ingest content can be monitored and the usage can be logged for billing and usage counting purpose.

During development of a streaming media server configuration as illustrated in example 300 of FIG. 3, the inventors noticed that, however, that no matter how thoroughly code is tested on the Beta cluster 304, there are several device/code combinations that may not be captured by the user devices/streaming content combination available on the Beta cluster 304. The techniques disclosed in this document can be used to provide a thorough testing platform which enables developers to test properly using the same streams that are used by production code based streaming servers. In one aspect, the disclosed technology can be used to generate an exact duplicate, or a carbon copy, of ingest stream received from a content provider and provide the exact duplicate/carbon copy to a server running a code base being tested. A functional module, called streamproxy module, is used to create the carbon copy. The streamproxy module may use a stream right from the live cluster's ingest server and copy the stream with high fidelity to a Beta cluster server where the developers can observe if the stream causes any errors at the server or in the user device during playback. The streamproxy module can be used to copy streams to more than one server/channel.

Each server or a totality of servers in any cluster of server cluster 302, Beta cluster 304 and Test cluster 306 may be a computer or a computer system.

Figure 4:
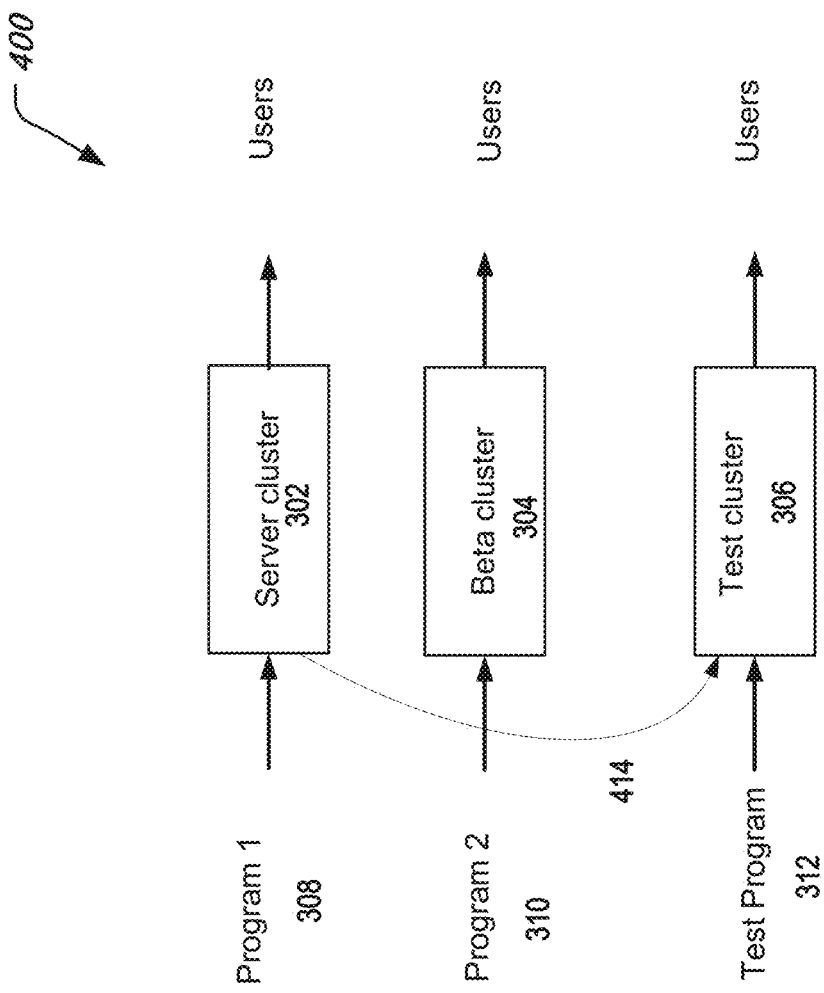
FIG. 4 shows another example of a streaming media server cluster configuration for testing server code changes, in accordance with embodiments of the present invention.

FIG. 4 shows another example of a streaming media server cluster configuration 400 for testing server code changes, in accordance with embodiments of the present invention. In addition to the example configuration 300 described with respect to FIG. 3, in configuration 400, a proxy stream 414 is established from the streaming server cluster 302 to the test cluster 306. Various techniques and embodiments disclosed in this document can be used to start the proxy stream 414, stop the proxy stream 414 and control other features of the proxy stream 414. In some embodiments, the ingested streams 308 for which proxy streams are generated may be controlled using a configuration file, as further described in this document.

In one embodiment, the proxy stream 414 may include a copy of the input program 308. In some embodiments, a proxy stream may be an exact replica of how the program 308 was received by the server cluster 302, including byte by byte timing of ingest. The testing and analysis done by the inventors of the present invention, however, have shown that potential errors in new server codes are often caused by the contents of the proxy streams; e.g., values of various data fields, encoding parameters used for encoding the digital audio and video contained in the proxy stream, etc., and rarely arise due to timing issues in receiving the stream. Thus, in some embodiments, implementers may reduce the complexity of implementations by only duplicating the contents of the received stream, and not duplicating the reception timing sequence of the individual bytes or packets that make up the stream.

In some embodiments, the ingested video stream may include multiple resolution or multi-bitrate versions of a same content. Such a multi-bit rate video may be used, e.g., for providing display screen sized appropriate version of content when media players request the content. For example desktop viewers might get high definition (HD) resolution streams while mobile phones on cellular networks lower resolution versions requiring less bandwidth. In one advantageous aspect, stream proxying can test for not just one version of encoded video but all versions, and also a user device's switching between different versions to ensure that such switching is seamless and synced.

Figure 5:
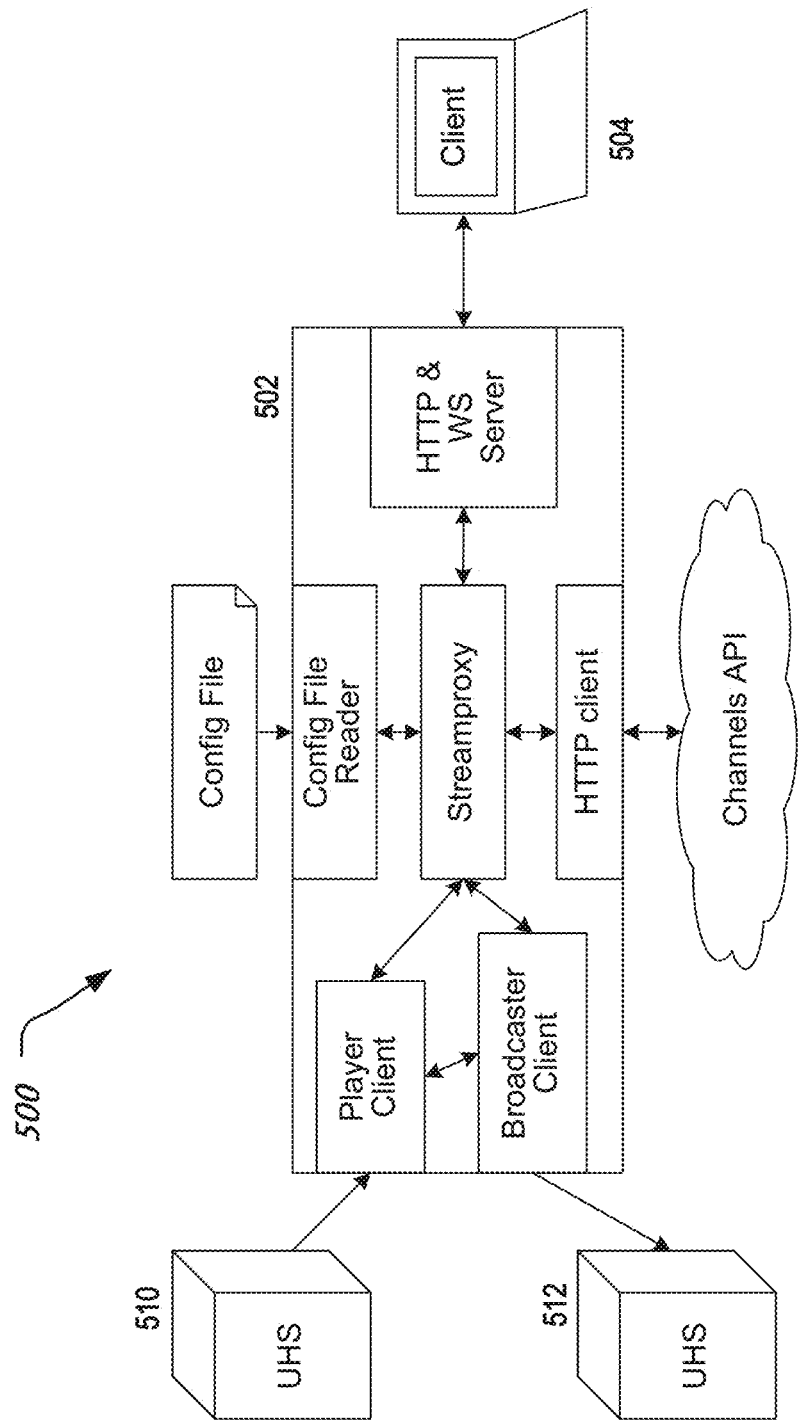
FIG. 5 shows an example block diagram of a stream proxying system, in accordance with embodiments of the present invention.

FIG. 5 shows an example block diagram of a stream proxying system 500, in accordance with embodiments of the present invention. In the stream proxying system 500, a streamproxy apparatus 502 includes a config file reader module that reads a configuration file that controls the proxying operation. A streamproxy logic module receives input parameters from the config file reader module that controls the operation of the streamproxy module. A client computer 504 may be communicatively coupled with the streamproxy apparatus 502 and may monitor and control the overall operation. An HTTP module may communicate with the client computer 504 using the HTTP protocol. Two Ultra High Speed (UHS) servers (510 and 512), which can be in the same cluster, are communicatively coupled to the stream proxying apparatus 502 to provide program streams, and receive proxy streams. Often, streamproxy apparatus 502 may be used to copy streams from one cluster to another, and thus the streamproxy apparatus 502 and the two UHS servers 510, 512 can be all in different server clusters, maybe all on different machines, or one of these servers (510, 512) can share a (physical or virtual) machine with another server. The message arrows between server 510, 512 and the streamproxy apparatus 502 represent the flow of media data (video/audio/metadata). The communication, in general, may be bi-directional, but the directionality of arrows illustrates that control messages are sent from the player client to the source UHS (510) and from the target UHS (512) to the broadcaster client. These control messages can be: connecting to the streamproxy application, sending the list of playable streams, creating or removing RTMP message streams, disconnecting from the application, etc.

Figure 6:
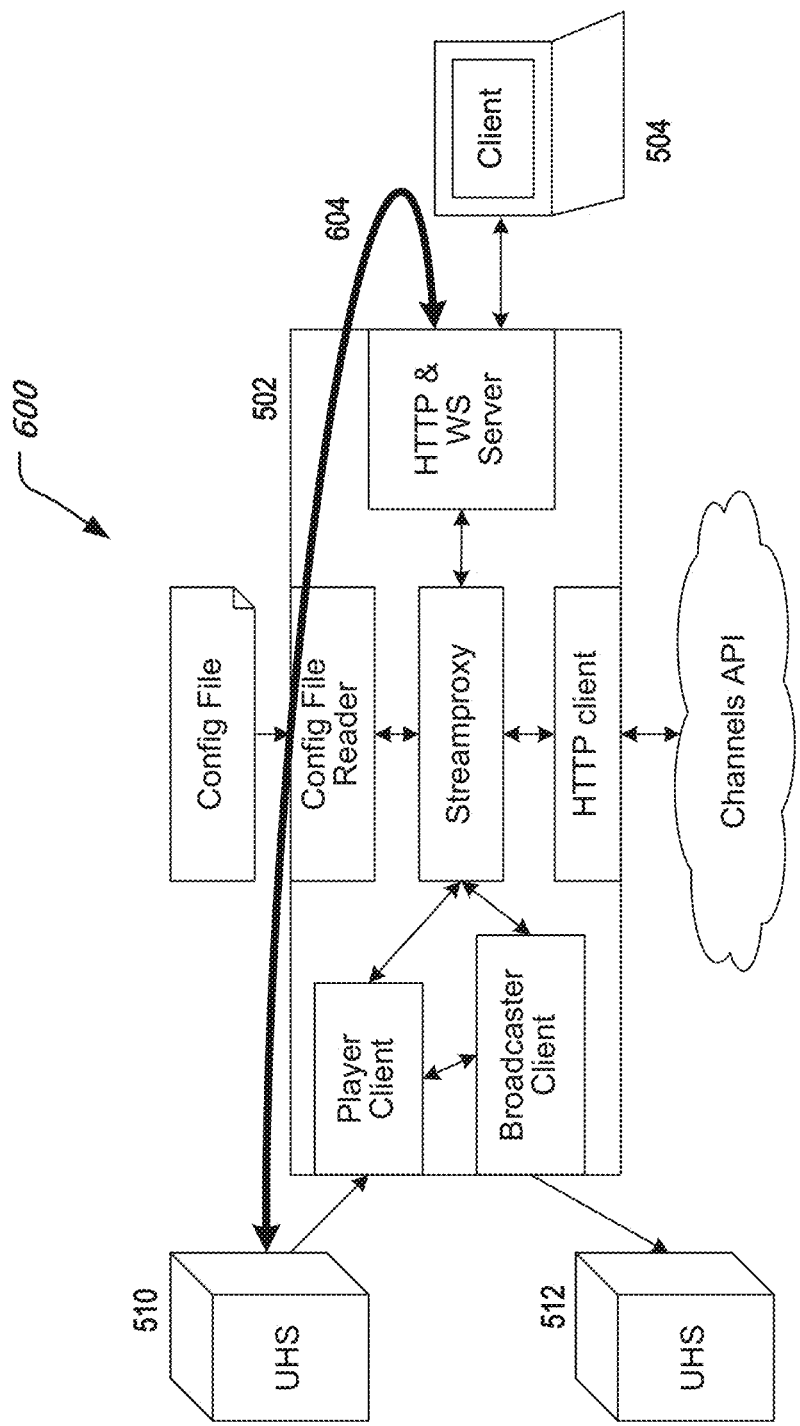
FIG. 6 shows another example block diagram of a stream proxying system, in accordance with embodiments of the present invention.

FIG. 6 shows another example block diagram of a stream proxying system 600, in accordance with embodiments of the present invention, in which media streams are proxied. In addition to the stream proxying system 500, in the stream proxying system 600, a communication path 604 is illustrated. The messages used in the stream proxying system 600 could be identical to the ones used in FIG. 5 between the client 504 and streamproxy apparatus 502. So, just like any other client 504, the UHS server 510 (or 512) could use a same mechanism to communicate on path 604 with the streamproxy apparatus 502. For example, the UHS server 510 or 512 can send messages via HTTP or WebSocket. One example format of these messages is illustrated in FIG. 7.

FIG. 7 shows example configuration file listings for a request to start a proxy operation and a structure generated in response to the request, accordance with embodiments of the present invention. FIG. 7 depicts example message or code listings using the Javascript Object Notation (JSON) format: (703) is an example request to start a proxy, and the structure of a response to that request. (705) and (707) are snippets from example configuration files, (705) being streamproxy's configuration file and (707) being that for a UHS.

The streamproxy apparatus 502 can use its configuration file (705) to map source channels to destination channels. In the example in FIG. 7, source channel 18693054 is mapped to destination channel 19311255, which means that whenever the streamproxy apparatus 502 receives a request to proxy the stream(s) from channel 18693054, the streamproxy apparatus 502 will create those streams on channel 19311255. The "channelKey" and "broadcastUrls" fields belong to the destination channel. The "channelKey" key is necessary to authenticate, and start the stream(s) on the destination channel. The address "broadcastUrls" is used to provide the address of the server where the destination channel should be created. The address "broadcastUrls" can contain more than one entry, so that a latter option can be used in case the previous server is unavailable.

Creating a proxy is done by the HTTP request, such as the example listed on the top of FIG. 7. The client issues a request to the address and TCP port on which the streamproxy apparatus 502 is listening. The request includes the source channel identifier (cid) and the source host (host), which is the host name of the server on which the source channel is found. Optionally, the "toTest" parameter can be provided, in which case, the destination channel will be in the test cluster. The message (703) is the response sent to this request via HTTP. In this response/, "generated" tells the requester whether the destination channel is one of streamproxy's own, programmatically generated channels (generated=true) or a channel provided in the configuration file (generated=false). Dedication shows whether the destination channel is dedicated to the beta or test cluster or not.

Dedication ensures that this destination channel application instance gets created on the beta or test cluster.

In some embodiments, the proxy operation may be configured to perform automatic start of proxying. In one advantageous aspect, auto start may ensure that the initial few packets (e.g., 2 packets) pass accurately through the test or beta server, without creating any unwanted glitches or errors when received on a client device for viewing. For example, when a new video stream playout starts, sometimes, audio and video of the stream may take time for syncing up, or sometimes some important information in header fields may be missed by decoders. In some embodiments, a stream buffer of sufficient duration (e.g., 2 to 5 seconds) may be used to buffer incoming video data so that no incoming packets are dropped from the proxying operation when the streamproxy system 500 initiates a proxy operation.

In some embodiments, the configuration file may identify which particular streams should be proxied. The identification may be based on service agreements with content providers. Alternatively or additionally, the streams that are proxied may be based on the streaming media service provider's past experience with certain content providers' bitstreams being especially problematic to code upgrades. When ingestion of new streams starts, the proxying process may be started automatically based on the configuration file.

Figure 8:
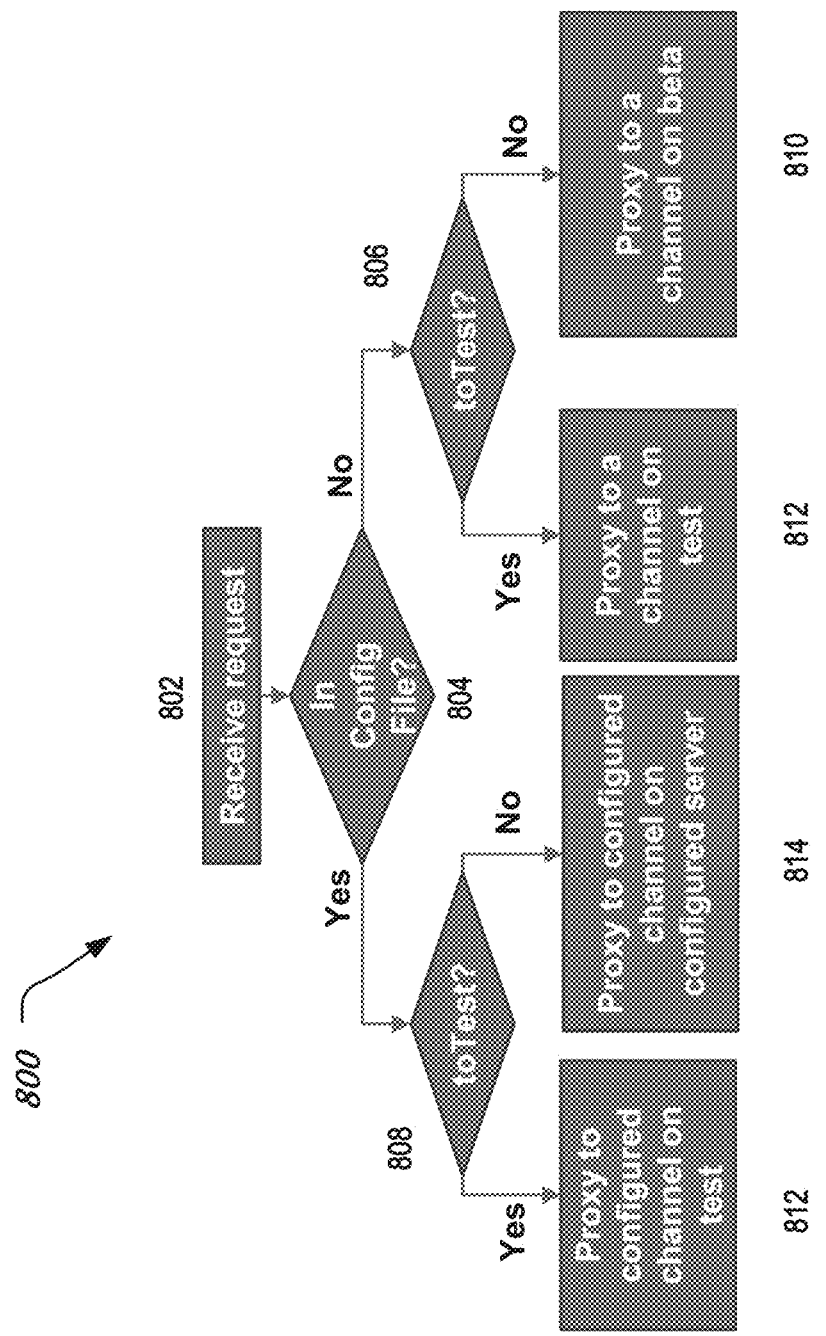
FIG. 8 shows an example workflow for stream proxying in a streaming media network using a configuration file, in accordance with embodiments of the present invention.

FIG. 8 shows an example workflow 800 for stream proxying in a streaming media network using the configuration file, in accordance with embodiments of the present invention. When a new request to proxy a stream is received (step 802), a determination is made about whether the request for the particular stream is included in the configuration file (step 804). The proxy stream can be used for testing code changes in the beta or test cluster as well. The toTest condition tests whether the "toTest" parameter had been provided in the proxy start request.

If, at step 804, it is determined that the received request is in the configuration file, then a determination is made about whether (Yes) or not (No) the stream is to be used for code change testing (step 808). If the determination in step 808 is Yes, then the stream is proxied to a channel on the test cluster (step 812). If the determination in step 808 is No, then the stream is configured for use on the normal streaming server (step 814).

If, at step 804, it is determined that the received request is not in the configuration file, then the toTest condition tests whether (Yes) or not (No) the "toTest" parameter had been provided in the proxy start request (step 806). If the determination in step 806 is Yes, then the stream is proxied to a channel on the text cluster (step 812 again). If the determination in step 806 is No, then the stream is proxied to a channel on the beta cluster (step 810).

Figure 9:
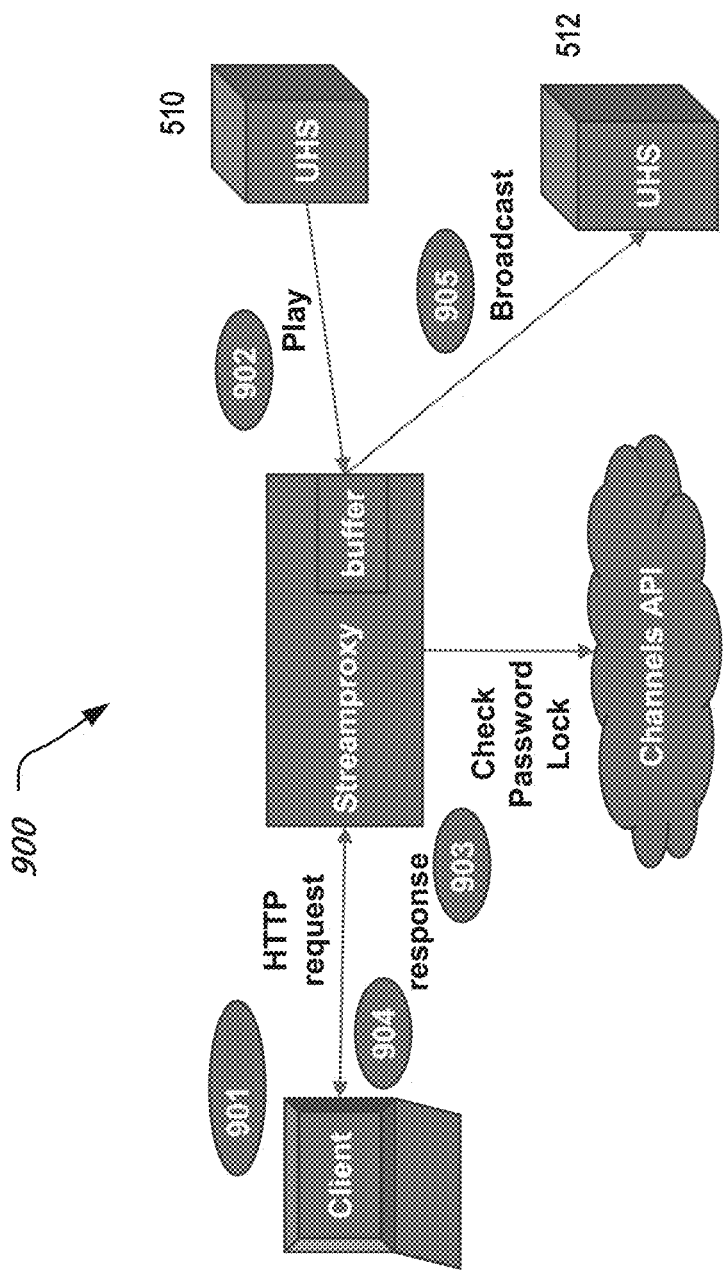
FIG. 9 shows messages exchanged in a streaming media network, in accordance with embodiments of the present invention.

FIG. 9 shows examples of messages exchanged in a streaming media network 900, in accordance with embodiments of the present invention. At step 901 a request from a client is received by the streamproxy module. At step 902, the UHS 510 provides or plays a stream to the server; the stream is subsequently broadcast to the UHS 512. At step 903, the streamproxy system checks whether the destination channel is protected by a password. This check is a safety measure to double check that the copy that streamproxy apparatus 502 will broadcast cannot be viewed by unauthorized clients. The proxy does not start if the destination channel is not protected by a password lock. The authorization of viewers may be performed by billing and authorization servers (not shown in FIG. 9).

FIG. 10 shows an example code listing for messages used during stopping stream proxy operation upon encountering an error, in accordance with embodiments of the present invention. When a stream proxy operation is stopped, the success of the operation and reasons for errors, if any, are captured for further analysis; e.g., as listed in FIG. 10. The proxy can be stopped at any time, not just in case of encountering an error. Stopping is done with the request; e.g., similar to the HTTP command listed on top of FIG. 10. The JSON code below the HTTP command is the response to that request. The "errorReason" field contains information about why the proxy could not be stopped (if there was any such error). This "errorReason" field is null if "success" is true.

Figure 11A:
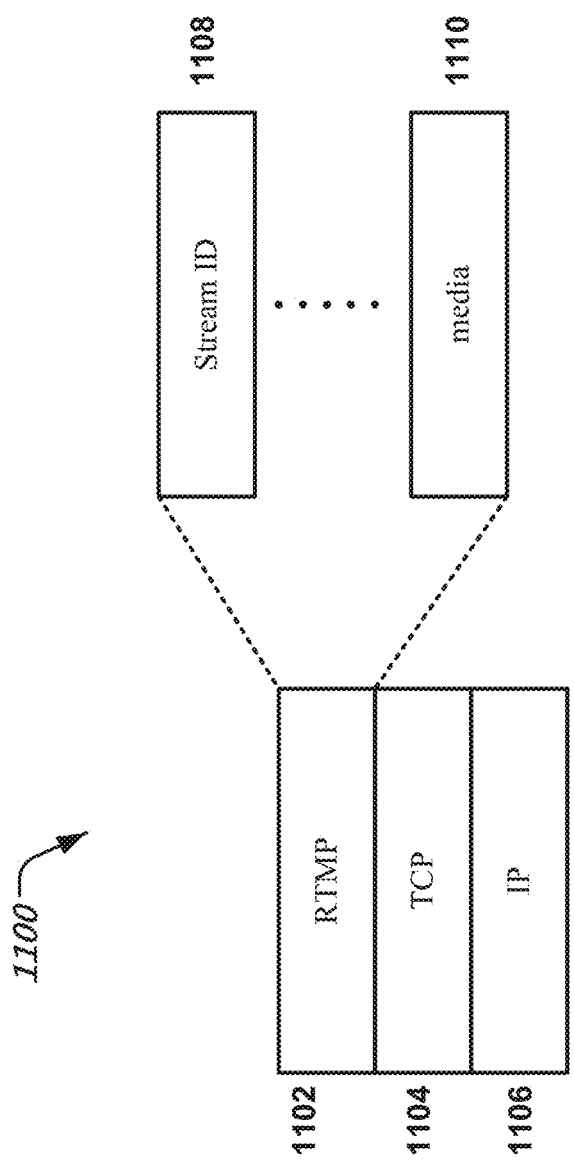
FIG. 11A shows an example protocol stack for stream proxy operation, in accordance with embodiments of the present invention.

FIG. 11A shows an example protocol stack 1100 for stream proxy operation, in accordance with embodiments of the present invention. A typical stream is ingested to the server cluster as Internet Protocol (IP) packets 1106, using an upper layer transport control protocol (TCP) structure 1104, in which a streaming protocol (e.g., RTMP (real time messaging protocol) 1102) is packetized. The streaming protocol may include details such as an identifier of the stream 1108 that uniquely identities the stream, and media data 1110; e.g., compressed audio and video data. As described herein, the copying operation may simply copy the contents at the RTMP layer from the ingested stream on to the proxy stream. In other words, when proxying an ingest stream to the proxy stream (e.g., stream 414 in FIG. 4), in some embodiments, only the RTMP layer bytes may be duplicated, with the TCP and IP packetization details changing based on the source and receiver TCP and IP addresses and socket numbers. Further, in some embodiments, a configuration file setting may control whether or not to duplicate or suppress data transmission errors below the RTMP layer. Since the operation of duplication of packet errors may involve additional complexity, in some embodiments, the default mode of operation may be to copy stream packets without duplicating underlying transmission errors and TCP packet re-transmissions. If the streaming service provider, however, believes that certain errors when using the new code in the test server 306 may be caused due to TCP or IP layer errors, then the streaming service provider may turn on lower layer stream copying via a setting in the configuration file.

Figure 11B:
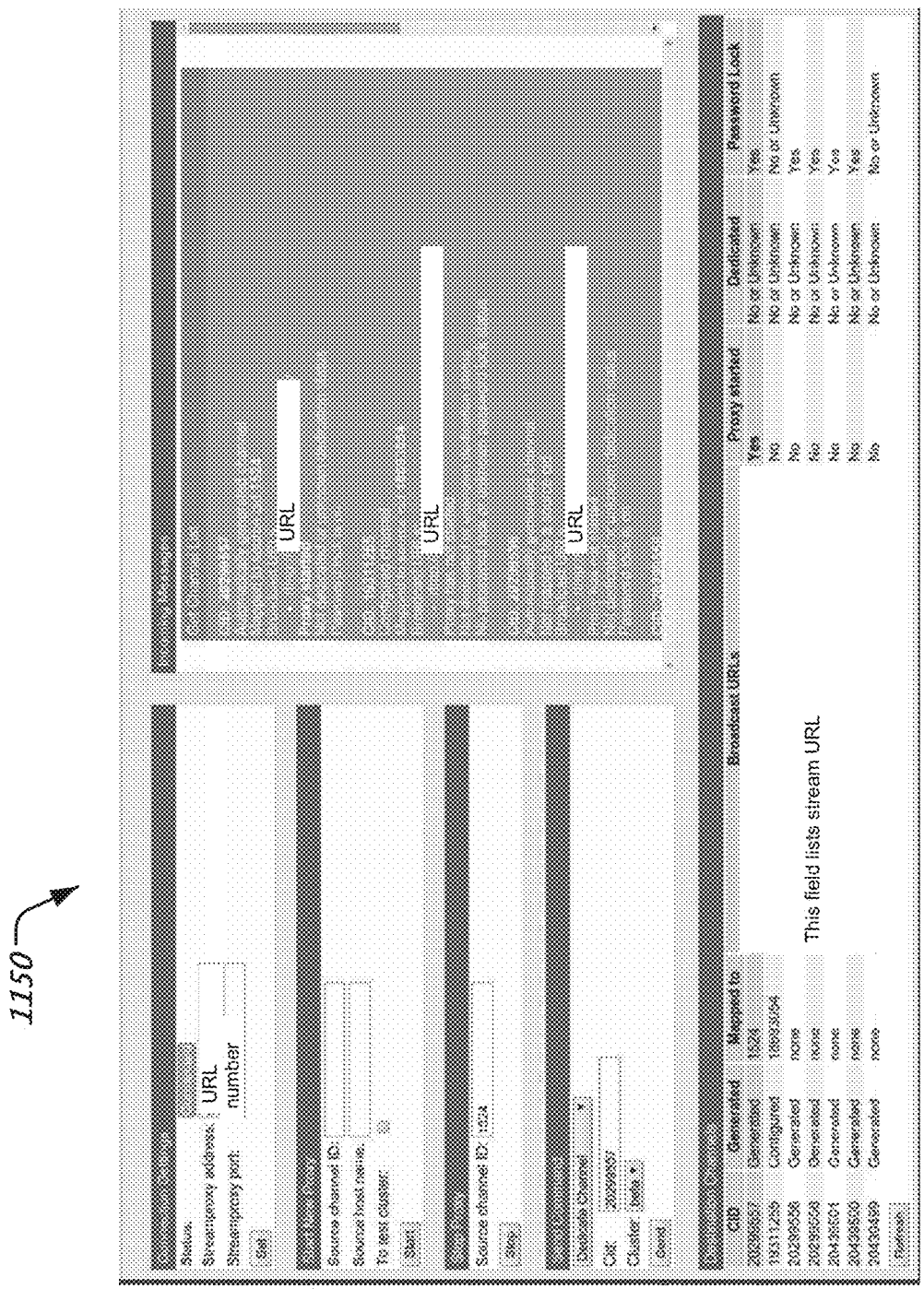
FIG. 11B shows an example user interface for controlling stream proxy operation, in accordance with embodiments of the present invention.

FIG. 11B shows an example user interface (UI) 1150 for controlling stream proxy operation, in accordance with embodiments of the present invention. The UI 1150 offer the following fields, some of which are depicted in FIG. 11B, and some or all of which can be included in various embodiments:

A field for displaying operation status; e.g., connected or offline.

A field that allows operator specification/read-back of the server. The "Streamproxy address" and "Streamproxy port" fields are used to specify the network address and port on which the Streamproxy application is listening. Filling out these fields, then hitting the "Set" button, connects to that Streamproxy application instance.

A field to specify/read-back a source channel identifier that the stream proxy originates from.

A field or a control that specifies whether the streamproxy is to go to the test cluster or not.

A control button to start the proxy stream.

A control field to specify a source channel and be able to turn off stream proxying operation for the source channel.

A field that specifies the type of channel on which to turn on a proxying operation and identity of the cluster to which commands from the UI 1150 are to be directed. The "Send Command" box includes a drop-down menu, that contains possible commands that can be sent to the Streamproxy apparatus 502. In the background, when the "Send" command is clicked, the client application creates a JSON message and sends the JSON message to the Streamproxy apparatus 502 via Web Socket. The "Cid" text field and "Cluster" drop-down are specific to the currently selected "Dedicate Channel" command. These additional controls change according to which command is selected in the commands drop-down. The "Dedicate Channel" command dedicates the channel identified by "Cid" to the cluster selected in the "Cluster" drop-down. Examples of other commands: "Generate Channel(s)", "Get Active Proxies", "Get Proxy Mappings", etc.

A field that displays incoming messages from various channels for which proxy operation is ongoing, including information such as detail of the channel (from where, to where, identifier), a URL for the source of the proxy stream, whether or not the proxy stream is password protected, and so on.

A field that displays a list of destination channels currently operational in the network. Each entry in this list may have multiple fields. These fields may include: channel identifier for the entry, whether the channel is configured (but not yet generated) or is generated, stream identifier to which the proxy has been mapped, the broadcast URL being used for the proxy stream, whether the proxy stream is currently active, whether the proxy stream is dedicated and whether or not the proxy stream is to be password protected. The "Generated" column shows whether that particular destination channel was generated pragmatically by the Streamproxy apparatus (Generated) or it was specified in the configuration file (Configured). "Dedicated" shows whether the destination channel is dedicated to the beta or test cluster or not. Dedication ensures that this destination channel application instance gets created on the beta or test cluster.

In one advantageous aspect, password-protection of a stream may disallow unauthorized access by user devices to premium media streams that are being proved to the beta server or the test server.

Figure 12:
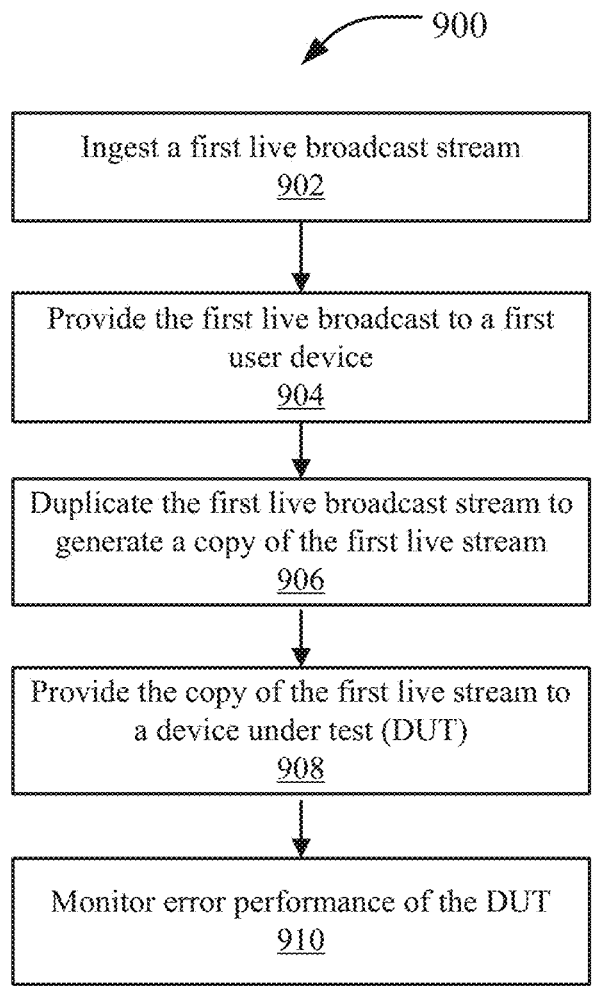
FIG. 12 shows an example method using stream duplication for code testing in a video streaming network, in accordance with embodiments of the present invention.

FIG. 12 shows an example method 900 using stream duplication for code testing in a video streaming network, in accordance with embodiments of the present invention. In one embodiment, the method 900 may be implemented at a streaming media server facility (e.g., the server cluster 302) which, in one embodiment, may be managed by a streaming media service provider.

The method 900 includes, at step 902, ingesting (i.e., receiving) a first broadcast stream to a server cluster deployed for providing streaming media programs to multiple user devices; e.g., as described with respect to FIGS. 2 to 4. In some embodiments, the broadcast stream may be for a live program and may be being streamed in real time to many user devices.

The method 900 includes, at step 904, providing the first broadcast stream to one or more first user devices. The user devices may be in a group that represents a group of users with a particular SLA agreement, as described herein.

The method 900 includes, at step 906, duplicating the first broadcast stream to generate a copy of the first broadcast stream.

The method 900 includes, at step 908, providing the copy of the first broadcast stream to a device under test, e.g., to the test server 306 on which new code being tested is installed. The device under test is configured to test processing of the first broadcast stream by the new code installed at the device under test. In one embodiment, the new code is software code.

The method 900 includes, at step 910, monitoring error performance of the device under test (DUT) with respect to the new program code's processing of the first broadcast stream. The monitoring may include, e.g., monitoring encoding parameters used for encoding the copy of the first broadcast stream that is being streamed to the DUT. In some embodiments, a log file is maintained at a server.

In some embodiments, the method 900 may include protecting access to the proxy stream using an access control mechanism, e.g., user identification/password protection. Some example embodiments have been described herein with regard to FIG. 7 (channelkey). The channel key is used to authenticate the broadcaster on the UHS server. Protecting access to the created stream is done by a password lock.

Figure 13:
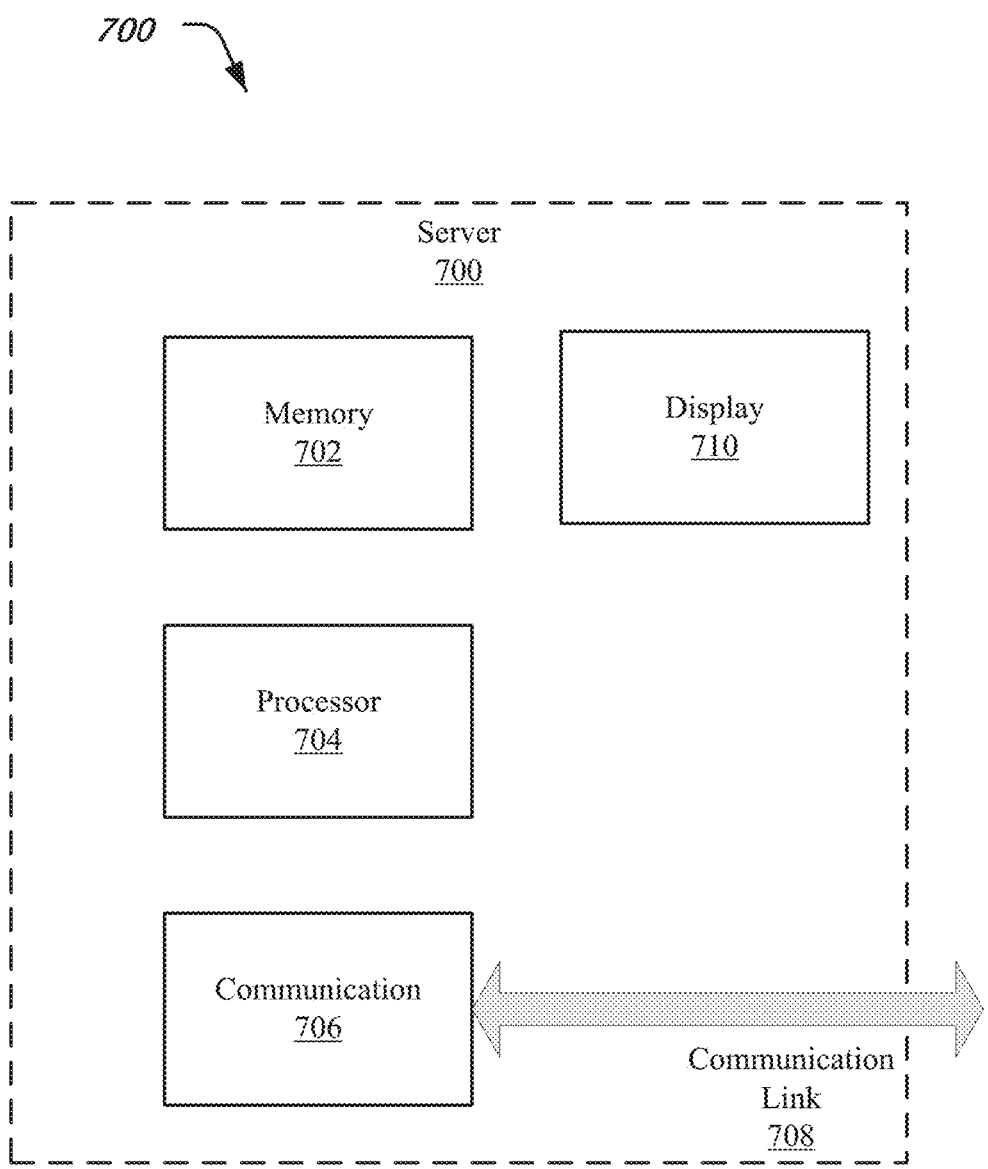
FIG. 13 shows an example of a server platform which could be used to implement techniques of the present invention.

FIG. 13 shows an example of a server platform 700 which could be used to implement techniques and methods of the present invention. The hardware server 700 may be used, e.g., as the servers 104, 116, 118, 206, 208, 214, etc. described herein. The server 700 includes memory 702, a processor 704 (which represents one or more processors) and a communication module 706. The memory 702 may store program code or data during operation of the server 700. The program code may be read by the processor 704 to implement methods described in the present document. The communication module 706 may control reception and transmission of data over communication links 708; e.g., an ingest IP connection and an outgoing IP connection. The server 700 may optionally include a display module 710 that may provide information to a display user interface. In one embodiment, the hardware storage device 707 stores program code configured to be executed by the one or more processors 704 via the memory 702 to implement methods of the present invention. In one embodiment, the server platform 700 may represent a computer or a computer system.

It will be appreciated by one of skill in the art that techniques for performing code upgrades in a streaming media network are disclosed. In one advantageous aspect, code upgrades can be tested without having to bring any servers or user devices offline.

In another aspect, error logs can be generated to allow system operators and software developers to understand stream format compatibilities that may lead to errors in the streaming media system.

The disclosed and other embodiments, modules and the functional operations described in this document (e.g., an optical receiver, a distortion compensator, a step size controller, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in his document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes a computer readable hardware storage device or medium (e.g., a memory), having computer readable program instructions stored therein, said program instructions executable by one or more processors of a server, a computer, or a computer system to implement the methods of the present invention.

A device, a computer, or a computer system of the present invention includes one or more processors and a computer readable hardware storage device or medium (e.g., a memory), said memory containing program instructions executable by the one or more processors to implement the methods of the present invention.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for code testing in a video streaming network, said method comprising:

providing, by one or more processors to one or more user devices, a first broadcast stream comprising a first program containing video content, said first broadcast stream deployed for providing streaming media programs to multiple user devices;

providing, by the one or more processors, a copy of the first broadcast stream to a device under test configured to test new code installed at the device under test via a processing of the first broadcast stream by the new code installed at the device under test, said device under test being a generic computer comprising a communication module that controls reception and transmission of data over multiple Internet Protocol (IP) communication links; and monitoring, by the one or more processors, error performance of the device under test with respect to the installed new code being tested via the processing of the first broadcast stream by the new code installed at the device under test, said monitoring error performance of the device under test comprising monitoring encoding parameters used for encoding the copy of the first broadcast stream that is being streamed to the device under test.

2. The method of claim 1, wherein said providing the copy of the first broadcast stream to the device under test comprises:

duplicating the first broadcast stream to generate the copy of the first broadcast stream.

3. The method of claim 1, wherein the first broadcast stream is a live broadcast stream.

4. The method of claim 1, wherein said providing the copy of the first broadcast stream to the device under test comprises:

generating a proxy stream containing the video content; and transmitting, from an ingest server of a live clusters of servers to the device under test, the proxy stream.

5. The method of claim 4, wherein the device under test is a test server of a Test cluster of servers deployed to test the new code installed at the device under test via the processing of the first broadcast stream by the new code installed at the device under test.

6. The method of claim 4, wherein the method further comprises:

transmitting, by the one or more processors, the proxy stream from the ingest server to a Beta server of a Beta cluster of servers deployed to determine if the proxy stream causes errors at the Beta server.

7. The method of claim 4, wherein said receiving the first broadcast stream comprises receiving the first broadcast stream from a source channel, and wherein the method further comprises:

controlling, by the one or more processors, the proxy stream by using a configuration file containing code to map the source channel to a destination channel for transmitting the proxy stream to the device under test.

8. A computer program product, comprising a computer readable hardware storage device having computer readable program code stored therein, said program code executable by one or more processors to implement a method for code testing in a video streaming network, said method comprising:

providing, by the one or more processors to one or more user devices, a first broadcast stream comprising a first program containing video content, said first broadcast stream deployed for providing streaming media programs to multiple user devices;

providing, by the one or more processors, a copy of the first broadcast stream to a device under test configured to test new code installed at the device under test via a processing of the first broadcast stream by the new code installed at the device under test, said device under test being a generic computer comprising a communication module that controls reception and transmission of data over multiple Internet Protocol (IP) communication links; and monitoring, by the one or more processors, error performance of the device under test with respect to the installed new code being tested via the processing of the first broadcast stream by the new code installed at the device under test, said monitoring error performance of the device under test comprising monitoring encoding parameters used for encoding the copy of the first broadcast stream that is being streamed to the device under test.

9. The computer program product of claim 8, wherein said providing the copy of the first broadcast stream to the device under test comprises:

duplicating the first broadcast stream to generate the copy of the first broadcast stream.

10. The computer program product of claim 8, wherein the first broadcast stream is a live broadcast stream.

11. The computer program product of claim 7, wherein said providing the copy of the first broadcast stream to the device under test comprises:

generating a proxy stream containing the video content; and transmitting, from an ingest server of a live clusters of servers to the device under test, the proxy stream.

12. The computer program product of claim 11, wherein the device under test is a test server of a Test cluster of servers deployed to test the new code installed at the device under test via the processing of the first broadcast stream by the new code installed at the device under test.

13. The computer program product of claim 11, wherein the method further comprises:

transmitting, by the one or more processors, the proxy stream from the ingest server to a Beta server of a Beta cluster of servers deployed to determine if the proxy stream causes errors at the Beta server.

14. The computer program product of claim 11, wherein said receiving the first broadcast stream comprises receiving the first broadcast stream from a source channel, and wherein the method further comprises:

controlling, by the one or more processors, the proxy stream by using a configuration file containing code to map the source channel to a destination channel for transmitting the proxy stream to the device under test.

15. A computer system, comprising one or more processors, a memory, and a computer readable hardware storage device, said storage device containing program code executable by the one or more processors via the memory to implement a method for code testing in a video streaming network, said method comprising providing, by the one or more processors to one or more user devices, a first broadcast stream comprising a first program containing video content, said first broadcast stream deployed for providing streaming media programs to multiple user devices;

providing, by the one or more processors, a copy of the first broadcast stream to a device under test configured to test new code installed at the device under test via a processing of the first broadcast stream by the new code installed at the device under test, said device under test being a generic computer comprising a communication module that controls reception and transmission of data over multiple Internet Protocol (IP) communication links; and monitoring, by the one or more processors, error performance of the device under test with respect to the installed new code being tested via the processing of the first broadcast stream by the new code installed at the device under test, said monitoring error performance of the device under test comprising monitoring encoding parameters used for encoding the copy of the first broadcast stream that is being streamed to the device under test.

16. The computer system of claim 15, wherein said providing the copy of the first broadcast stream to the device under test comprises:

duplicating the first broadcast stream to generate the copy of the first broadcast stream.

17. The computer system of claim 15, wherein the first broadcast stream is a live broadcast stream.

18. The computer system of claim 15, wherein said providing the copy of the first broadcast stream to the device under test comprises:

generating a proxy stream containing the video content; and transmitting, from an ingest server of a live clusters of servers to the device under test, the proxy stream.

19. The computer system of claim 18, wherein the device under test is a test server of a Test cluster of servers deployed to test the new code installed at the device under test via the processing of the first broadcast stream by the new code installed at the device under test.

20. The computer system of claim 18, wherein the method further comprises:

transmitting, by the one or more processors, the proxy stream from the ingest server to a Beta server of a Beta cluster of servers deployed to determine if the proxy stream causes errors at the Beta server.

* * * * *